Dec. 16, 1947.  R. B. IMMEL  2,432,899
SHOCKPROOF ELECTROMAGNETIC CONTACTOR
Filed Nov. 16, 1944  2 Sheets-Sheet 1
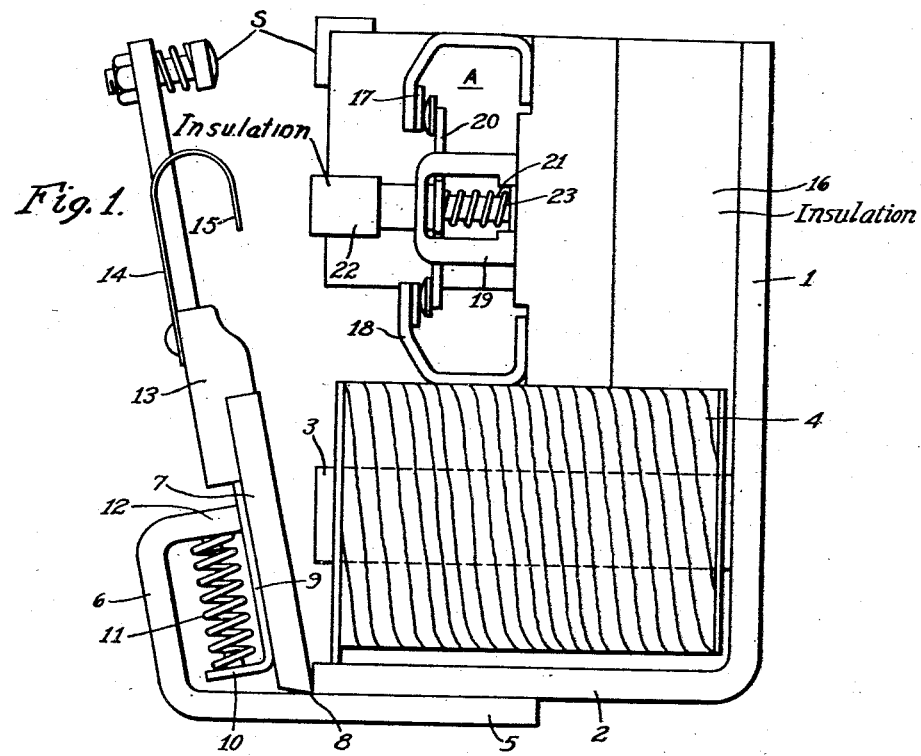
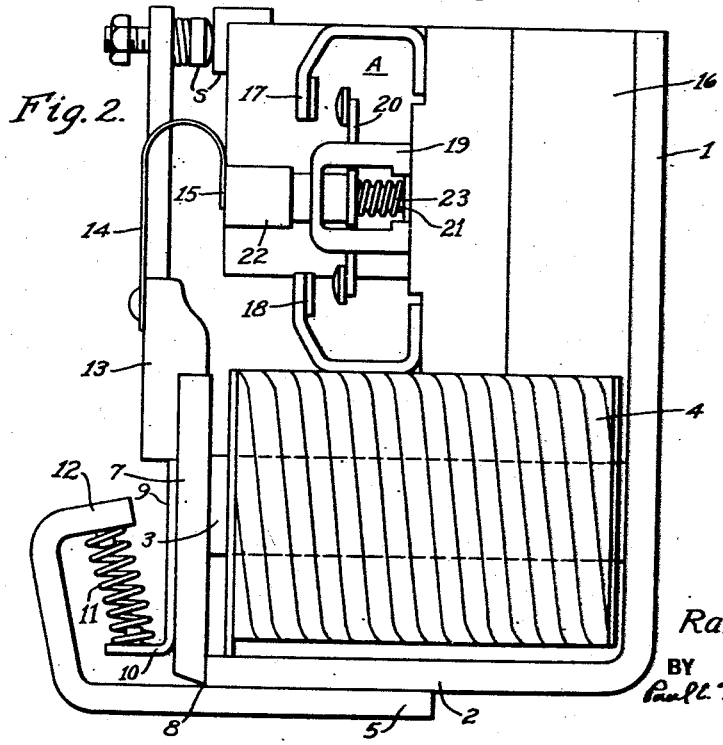
INVENTOR
Ralph B. Immel.
BY
Paul C. Friedemann
ATTORNEY Dec. 16, 1947.  R. B. IMMEL  2,432,899
SHOCKPROOF ELECTROMAGNETIC CONTACTOR
Filed Nov. 16, 1944  2 Sheets-Sheet 2
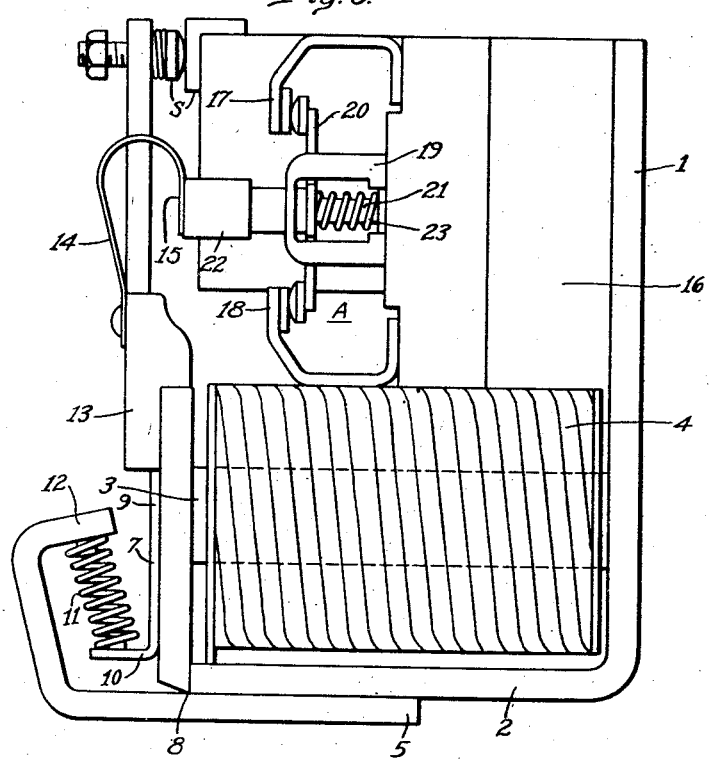
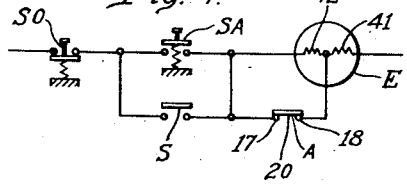
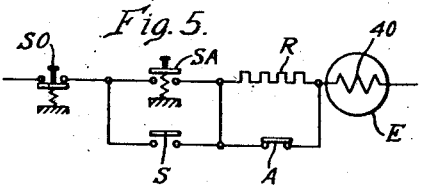
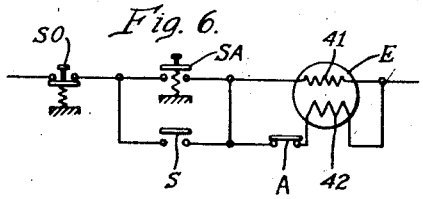
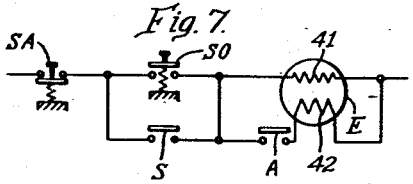
WITNESSES:
INVENTOR
Ralph B. Immel.
BY
Paul E. Friedemann
ATTORNEY Patented Dec. 16, 1947

2,432,899

UNITED STATES PATENT OFFICE 2,432,899

SHOCKPROOF ELECTROMAGNETIC
CONTACTOR

Ralph B. Immel, Wilkinsburg, Pa., assignor to Westinghouse Electric Corporation, East Pittsburgh, Pa., a corporation of Pennsylvania Application November 16, 1944, Serial No. 563,759

12 Claims. (Cl. 175—375)

My invention relates to electromagnetic apparatus such as contactors and the like circuit control devices, and has for its chief object to provide such apparatus with means which protect them from performing uncontrolled operations when subjected to vibration and shock.

For certain cases of application, for instance, on board of war vessels, it is essential that the electromagnetic relays and other apparatus serving for the control of vital electric equipment maintain their operating condition during the occurrence and existence of shocks. This is particularly necessary when the control apparatus are in their operative condition, that is, when the appertaining electromagnet is energized and holds the contact controlling armature in the closing position against the biasing forces usually provided for returning the armature or contact into the opening position upon deenergization of the magnet. The reason why shock protection is mainly and often only required during the operative or energized condition of the electromagnetic apparatus lies in the fact that then the direction of detrimental shock forces is the same as that of the opening bias of the kick-out and contact pressure springs so that shock and biasing forces act cumulatively against the holding force of the electromagnet.

It is known to provide electric contactors with shock-responsive inertia means which, when subjected to vibration, move a mechanical latch into the path of the armature, thereby preventing it to leave the position which it maintained immediately previous to the occurrence of shock. Another known way of shockproofing electromagnetic devices of the type above referred to is to design the armature and the entire movable assembly controlled by the armature as a statically and dynamically balanced system which is pivoted for motion about the balance axis.

Each of these known ways of obtaining shock protection involves certain disadvantages. For instance, an inertia controlled latching device is relatively complicated and, during the persistence of shock forces, prevents not only undesired operations but also an intended control motion. A balanced design is not always applicable, especially with clapper type armatures. In both cases, the forces and stresses occurring during shock may become undesirably high because of the above-mentioned cumulative effect of shock and biasing forces when the armature is in its closed position.

It is an object of my invention to provide means for shockproofing electromagnetic contactors and other apparatus having an armature movable between an opening and closing position by counteracting the cumulative effect of shock and biasing forces during the periods where such cumulative effect is apt to occur.

Another object, allied to the foregoing, is to devise shockproof electromagnetic apparatus that require neither a balanced design of the movable armature and contact assembly, nor the application of inertia controlled latching means so as to permit avoiding the above-mentioned drawbacks of these devices.

More specifically, it is also an object of my invention to produce a shock protective effect without preventing the electromagnetic apparatus from being subjected to an intended control operation during the occurrence or persistence of shocks and vibrations.

In order to achieve these objects, and in accordance with an essential feature of my invention, I provide an electromagnetic apparatus of the type mentioned with shock-responsive control means which, when in operation, increase the holding force of the electromagnet.

According to another feature of the invention, the electromagnetic apparatus is provided with an inertia responsive auxiliary contact which, under the influence of shock or vibration, controls an electric energizing circuit of the electromagnet so as to increase its energization and thereby the magnetic holding force imposed on the movable armature or contact assembly.

In accordance with still another feature of my invention, the control contact for increasing the energization and holding force of the electromagnet is mechanically coupled or interlocked with the movable armature assembly controlled by the magnet so that the inertia responsive control means are operative only when the magnet has previously been energized and has caused the armature assembly to move into its closing position against the force of the appertaining biasing or contact spring.

These and other objects and features of my invention will be apparent from the following description of the embodiments illustrated in the drawings, in which:

Figure 1 is a lateral view of an electromagnetic contactor designed in accordance with the invention, the illustration showing the contactor in the open position of its armature assembly;

Fig. 2 shows a somewhat simplified side view of the same contactor with its armature assembly in the operative or closed position;

Fig. 3 is a similar view of the same contactor showing the armature also in the closed position but under conditions as occurring during the persistence of impact, shock, or vibration of sufficient magnitude to operate the shock-responsive control means; and Figs. 4, 5, 6, and 7 represent straight-line diagrams of four different operating circuits suitable in connection with electromagnetic apparatus according to the invention as exemplified by Figs. 1, 2, and 3.

Referring to Fig. 1, the illustrated contactor has a substantially L-shaped frame I of magnetizable material whose leg 2 extends in parallel to an appertaining magnet core 3. The core is provided with an energizing coil 4 composed of one or two windings whose rating and electric connection will be referred to in a later place. A non-magnetic bracket 5 is firmly attached to leg 2 and has a portion 6 extending toward the magnet core 3 in order to form a stop for the armature and for accommodating the appertaining biasing or kick-out spring. The armature 7 forms a pivot edge at 8 which rests against a dihedral pivot bearing formed by the junction of leg 2 and bracket 5. An angular member 9 is firmly secured to the armature 7 and forms an abutment 10 for one end of the above-mentioned biasing spring which consists of a helical compression spring 11. The other end of the spring rests against an abutment formed by the end 12 of bracket portion 6 which represents also the aforementioned stop for limiting the angular motion of the armature 7 away from the magnet core 3. The force of spring 11 has the tendency to hold the pivot edge 8 against its bearing and the armature 7 against the stop 12. When the coil 4 is energized, the armature 7 is attracted by the magnet core 3 and moves into the closing position shown in Fig. 2, against the biasing force of spring 11, thereby controlling the main and sealing contacts of the contactor. These contacts are not illustrated in Figs. 1, 2 and 3 because they may be of any customary design. However, the sealing contact is schematically represented in the circuit diagrams of Figs. 4 through 7 where it is denoted by 5.

An insulating body 13 attached to the armature 7 carries a U-shaped leaf spring 14 whose free end and 15 serves to operate an auxiliary contact device A to be described presently.

An insulating base 16 is firmly mounted on frame 1 and carries two stationary contacts 17 and 18. A stirrup member 19 also secured to the base 16 serves as a guidance for a movable contact 20 which in the inoperative position shown in Fig. 1 bridges the stationary contacts 17 and 18. The movable contact 20 is mounted on a slidable pin 21 which carries an insulating button 22. A biasing spring 23 seated on pin 21 tends to hold the contact 20 in the closing position.

When the coil 4 is energized and the armature 7 attracted, end 15 of leaf spring 14 engages button 22 and moves contact 20 into the opening position illustrated in Fig. 2 under compression of the biasing spring 23. Consequently, when the armature assembly and the appertaining main contacts are in the closed position, the auxiliary contact remains open as long as no shock occurs.

Under the influence of shock forces tending to move the armature assembly into its open position, the mechanical oscillatory system formed by the movable contact 20 and the springs 23 and 14 is caused to vibrate. The natural frequency of this system is considerably higher than that of the mechanical oscillatory system represented by the comparatively heavy armature assembly and the comparatively stiff biasing spring 11. Consequently, the auxiliary contact moves once or several times into the contact closing position shown in Fig. 3, against the resilient force of leaf spring 14, before the armature assembly can perform an appreciable angular motion away from the magnet core. Each time the contacts 17 and 18 are bridged, a control circuit is closed which increases the energization and holding force of the magnet and thus returns the armature or prevents it from opening. The inductance of the control circuit causes an arc to be drawn during the initial periods of interruption so that the time of increased energization is considerably longer than the time of actual contact engagement.

The operation of the auxiliary contact device A will be more fully understood by a reference to the circuit diagram shown in Fig. 4.

In Fig. 4, the self-sealing contact S and the auxiliary contact device A of the contactor are schematically shown as separate switch members. The electromagnet for controlling both contacts S and A is denoted by E and is provided with two windings 41 and 42 which make up the coil 4 according to Figs. 1, 2 and 3. While winding 42 is rated for continuous operation, the winding 41, receiving reduced current most of the time, may have relatively high ampere turns and hence is preferably rated for intermittent operation only. A start contact SA and a stop contact SO formed for instance by push-button switches are provided for controlling the operation of the contractor.

In the inoperative position of the circuit, the stop contact SO and the contacts of the inertia responsive auxiliary device A are closed, while the sealing contact S and the start contact SA are open. In order to close the contactor, the start contact SA is closed. As a result, the winding 41 is energized by the current flowing through contacts SO, SA, and A. Winding 42 is deenergized because it is short-circuited by contact A. The energization of coil 41 causes the armature to actuate the main contact of the relay and to close contact S, while contact A is opened. Thereafter, both coils 41 and 42 remain energized so that then coil 42 acts as a current reducing series resistance relative to coil 41. The armature remains in the closed position after the start button SA is released by the operator. In order to deenergize the contactor, the stop button SO is depressed and interrupts the circuit so that the sealing contact S is opened and the circuit returned into its original condition.

By comparing Fig. 4 with Figs. 1, 2, and 3, it will be clear that the closure of auxiliary contact A under the effect of shock or vibration short-circuits the winding 42 so that winding 41 receives temporarily an increased energization in order to increase the holding force of the magnet.

According to the embodiment of the operating circuit shown in Fig. 5, a single winding 40 is used in the electromagnet E. A resistor R is connected in series to winding 40 and in parallel to the auxiliary contact A. The resistor R is normally short-circuited by the auxiliary contact A. When the start button SA is depressed, the winding 40 is at first energized through closed contact A and hence has initially high ampere turns. It attracts the armature assembly, thereby closing the self-sealing contact S and opens the auxiliary contact A. Consequently, the contactor remains energized while resistor R is effective to reduce the winding 40 to a continuous low ampere turn energization. During shock, the auxiliary contact A recloses as explained in the foregoing, thereby short-circuiting the resistor R temporarily in order to increase the holding force of the magnet.

According to the diagram of Fig. 6, the electromagnet E is provided with a main coil 41 rated for continuous operation and a high amperage winding 42 rated for intermittent operation, both acting cumulatively. When closing start button SA, the magnet is at first energized by both windings. After placing the armature into closing position, contact S is closed and the auxiliary contact A opened so that only the low ampere turn winding 41 remains continuously energized until the circuit is opened by means of the stop button SO. At the occurrence of shock, contact A may reclose, thereby increasing the holding force.

It will be understood from the foregoing description of Figs. 4, 5, and 6 that in these embodiments the inertia controlled auxiliary switch is so operated that it increases the force of the magnet, not only under shock condition, but also provides an increased attractive force when first moving the armature assembly into closing position. However, the operating circuit may also be designed so that the second coil or the circuit means controlled by the inertia responsive switch do not assist the normal closing operation. An embodiment of this type is shown in Fig. 7. The circuit diagram here shown is substantially the same as that of Fig. 6 except that the auxiliary contact A is normally open and closes only when subjected to shock. This circuit requires a modification of the contactor shown in Figs. 1, 2, and 3 consisting in the omission of the interlock element 14, 15 between the armature 7 and the switch A and in designing the switch A as a normally open contact device.

In general, the intermittently operating coils in the above-described embodiment should preferably be rated for a low resistance and low number of turns in order to obtain a low time constant and quick response. The occurrence of arcing at the shock-responsive contact provides usually an energizing period longer than that of the actual contact touch time.

Electromagnetic contactors for use on Navy vessels have been designed and used successfully with a rating of the magnet coil and its appertaining inertia responsive control means which provided approximately 1000 ampere turns during normal operation and approximately 8000 ampere turns for a holding during shock.

It is of course possible to combine apparatus according to the invention with shock responsive latching means for a balanced design, as mentioned in the introduction of this specification, with a view to reducing the static spring forces and the stresses otherwise occurring in the mechanical parts of the apparatus when under shock.

In view of these and other possibilities of modifying apparatus according to my invention without departing from its spirit and scope, I wish this specification to be understood as illustrative rather than in a limiting sense.

I claim as my invention:

1. Electromagnetic apparatus having an armature movable between two positions and biased toward one of them, an electromagnet for moving said armature against its bias toward said other position and holding it therein when energized, circuit means connected with said electromagnet for increasing, when operative, the holding force of said electromagnet on said armature, and shock responsive movable contact means disposed for controlling said circuit means so as to increase said force when responding to shock.

2. Electromagnetic apparatus having an armature movable between two positions and biased toward one of them, an electromagnet having winding means for moving said armature against its bias toward said other position and holding it therein when energized, circuit means connected with said winding means for temporarily increasing when operative the energization of said winding means in order to increase the holding force of said electromagnet on said armature, and shock responsive movable contact means disposed for controlling said circuit means so as to render said circuit means operative to increase said energization in response to shock.

3. Electromagnetic apparatus having an armature movable between two positions and biased toward one of them, an electromagnet for moving said armature against its bias toward said other position and holding it therein when energized, circuit means connected with said electromagnet for increasing, when operative, the holding force of said magnet on said armature, and shock responsive movable contact means disposed for controlling said circuit means and controlled by said armature so as to cause an increase of said force in response to shock when said armature is in said other position.

4. Electromagnetic apparatus having an armature movable between two positions and biased toward one of them, an electromagnet having two windings for holding when energized said armature against its bias in said other position, and shock responsive spring biased contact means electrically connected with said windings and controlled by said armature so as to be operative for controlling the energization of one of said windings so as to increase the holding force of said electromagnet in response to shock when said armature is in said other position.

5. An electromagnetic contactor having an armature movable between two positions and biased toward one of them, magnetic means for holding said armature in said other position against its bias, a winding magnetically associated with said means for increasing the holding force of said means on said armature, and shock responsive mechanical means oscillatorily mounted and electrically connected to said winding for controlling it to increase said force in response to shock.

6. An electromagnetic contactor having an armature movable between two positions and biased toward one of them, magnetic means for holding said armature in said other position against its bias, a winding magnetically associated with said means for varying the holding force of said means on said armature, shock responsive mechanical means oscillatorily mounted and electrically connected to said winding for controlling it so as to increase said force in response to shock, and interlock means between said armature and said mechanical means for rendering the latter operative only when said armature is in said other position.

7. An electromagnetic contactor having an armature movable between two positions and biased toward one of them, an electromagnet having a first winding for holding when energized said armature in said other position against the armature bias and a second winding for varying the holding force of said electromagnet on said armature, shock responsive contact means oscillatorily mounted and connected with said second winding for controlling its energization so as to increase said force when responding to shock, and interlock means disposed between said armature and said contact means for rendering the latter operative only when said armature is in said other position.

8. An electromagnetic contactor having an armature movable between two positions and biased toward one of them, an electromagnet having a first winding for holding when energized said armature in said other position against the armature bias and a second winding for increasing when energized the holding force of said electromagnet on said armature, shock responsive contact means movable between two positions and biased toward one of them, said contact means being electrically connected with said second winding for energizing it when in said one position, and resilient control means attached to said armature for resiliently holding said contact means in its other position when said armature is in its other position while permitting said contact means to move into its energizing position when responsive to shock.

9. Electromagnetic circuit control means for comprising a contactor having an armature movable between two positions and biased toward one of them, an electromagnet having a first winding for holding when energized said armature in said other position against the armature bias and a second winding for increasing when energized the holding force of said electromagnet on said armature, shock responsive contact means oscillatorily mounted and connected with said second winding for energizing it when responding to shock, electric control means for energizing said first winding, and a mechanical connection disposed between said armature and said contact means so that said contact means are operative to energize said second winding under shock only upon energization of said first winding and when said armature is in its other position.

10. An electromagnetic contactor having an armature movable between two positions and biased toward one of them, an electromagnet having two windings for controlling said armature, shock responsive contact means having a contact member movable between two positions and a spring for biasing said member toward one of them, said armature having resilient means for holding said member toward its other position when said armature is in its other position while permitting said member to move under its bias and against said resilient means into said one position of said member when responding to shock, said contact means being connected with one of said windings for increasing the holding force of said electromagnet when thus responding.

11. Electromagnetic circuit control means comprising a contactor having an armature movable between two positions and biased toward one of them, an electromagnet having a first winding for holding when energized said armature in said other position against the armature bias and a second winding for increasing when energized the holding force of said electromagnet on said armature, shock responsive contact means having a contact member movable between two positions and a spring for biasing said member toward one of them, said armature having resilient means for holding said member toward its other position when said armature is in its other position while permitting said member to move under its bias and against said resilient means into said one position of said member when responding to shock, and electric control means connected with said first winding and said contact means so that said second winding is energized under shock only when said first winding is energized and said armature moved into its other position.

12. Electromagnetic apparatus having an armature movable between two positions and biased toward one of them, an electromagnet having a first winding rated for continuous energization and disposed for holding when energized said armature against its bias in said other position, said electromagnet having also a second winding rated for intermittent energization and disposed for increasing when energized the holding force of said electromagnet on said armature, and shock responsive spring biased contact means electrically connected with said second winding and controlled by said armature so as to be operative for energizing said second winding under shock when said armature is in said other position.

RALPH B. IMMEL.

REFERENCES CITED

The following references are of record in the file of this patent:

UNITED STATES PATENTS

| Number | Name | Date |
| --- | --- | --- |
| 1,735,225 | White | Nov. 12, 1929 |
| 2,137,747 | Agnew | Nov. 22, 1938 |
| 2,365,541 | Fountain | Dec. 19, 1944 |